United States Patent
Jiang et al.

(10) Patent No.: US 10,804,694 B2
(45) Date of Patent: Oct. 13, 2020

(54) OVER-TEMPERATURE PROTECTION CIRCUITRY AND DRIVING METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Ran Jiang, Beijing (CN); Hai Kang, Beijing (CN); Donghui Wang, Beijing (CN); Lei Hua, Beijing (CN); Zhen Tang, Beijing (CN); Weiwei Pan, Beijing (CN); Hongxun Zhang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 396 days.

(21) Appl. No.: 15/845,359

(22) Filed: Dec. 18, 2017

(65) Prior Publication Data

US 2018/0294638 A1    Oct. 11, 2018

(30) Foreign Application Priority Data

Apr. 5, 2017 (CN) .......................... 2017 1 0217619

(51) Int. Cl.
*H02H 5/04* (2006.01)
*H02H 1/00* (2006.01)

(52) U.S. Cl.
CPC .......... *H02H 5/047* (2013.01); *H02H 1/0007* (2013.01); *H02H 5/042* (2013.01)

(58) Field of Classification Search
CPC ............ G01K 1/02; G01K 7/32; G01K 3/005; G01K 7/01; G01K 7/015; G01K 7/16;
(Continued)

(56) References Cited

U.S. PATENT DOCUMENTS

| | | | | |
|---|---|---|---|---|
| 4,467,386 A | * | 8/1984 | Wasson ..................... | G05B 9/02 219/501 |
| 8,450,948 B2 | * | 5/2013 | Huang .................. | H05B 45/10 315/309 |

(Continued)

FOREIGN PATENT DOCUMENTS

CN    101646290 A        2/2010
CN    201629564 U   *   11/2010
(Continued)

OTHER PUBLICATIONS

First Office Action for Chinese Application No. 201710217619.1, dated Jun. 19, 2018, 7 Pages.

*Primary Examiner* — Jared Fureman
*Assistant Examiner* — Nicolas Bellido
(74) *Attorney, Agent, or Firm* — Brooks Kushman P.C.

(57) ABSTRACT

An embodiment of the present disclosure discloses an over-temperature protection circuitry and a driving method. The circuit includes a source circuit, a comparator circuit and an output circuit, wherein the comparator circuit includes a thermistor, a first resistor and a comparator, the source circuit is connected to a first input terminal of the comparator via the thermistor and is connected to a second input terminal of the comparator via the first resistor; and the comparator circuit is configured to compare a first signal from the first input terminal with a second signal from the second input terminal, and output a control signal according to a comparison result, the control signal is an over-temperature control signal in the case that the comparison result (Continued)

indicates that the temperature is greater than or equal to a protection threshold, and the output circuit is configured to output an disenabling signal.

16 Claims, 3 Drawing Sheets

(58) Field of Classification Search
CPC .......... H03K 5/24; H02H 1/0007; H02H 5/04; H02H 5/042; H02H 5/047; H02H 7/20; H02H 9/042; G06F 1/206; H01L 23/34; H01L 27/0251; H02J 7/0029; H02J 7/00309; H02J 7/0072
See application file for complete search history.

(56) References Cited

U.S. PATENT DOCUMENTS

2010/0321845 A1   12/2010   Imura et al.
2013/0266041 A1*  10/2013   Giri .......................... G01K 7/25
                                                       374/171

FOREIGN PATENT DOCUMENTS

| | | | |
|---|---|---|---|
| CN | 201629564 U | | 11/2010 |
| CN | 101931211 A | | 12/2010 |
| CN | 201904603 U | * | 7/2011 |
| CN | 201904603 U | | 7/2011 |
| JP | 2011061966 A | | 3/2011 |

* cited by examiner

OVER-TEMPERATURE PROTECTION CIRCUITRY AND DRIVING METHOD

CROSS-REFERENCE TO RELATED APPLICATION

This application claims priority to Chinese Patent Application No. 201710217619.1 filed Apr. 5, 2017, which is incorporated herein by reference in its entirety.

TECHNICAL FIELD

The present disclosure relates to a field of an electronic circuit, in particular to an over-temperature protection circuitry and a driving method.

BACKGROUND

As for an existing integrated circuit, function integration is implemented continuously, and a circuit scale is increased. However, a temperature rise due to power consumption and an increase in environment temperature have an adverse impact on stability of a circuit performance. In addition, for an existing chip of the integrated circuit (IC), a device integrated therein with an over-temperature protection (OTP) function is mainly an active device, for example, Power-like IC RT8510. A passive device (such as a passive chip) is not provided therein with an OTP protection circuit, so if such a device operates for a long period of time, a temperature rise due to power consumption and an increase in environment temperature would cause a temperature drift in a working voltage of the device, and result in the passive device operating in an abnormal state, even burnout of a device.

SUMMARY

The present disclosure provides an over-temperature protection circuitry and a driving method.

In order to achieve the purpose of the present disclosure, an embodiment of the present disclosure provides an over-temperature protection circuitry, including a source circuit, a comparator circuit and an output circuit, wherein the comparator circuit includes a thermistor, a first resistor and a comparator, the source circuit is connected to a first input terminal of the comparator circuit via the thermistor and is connected to a second input terminal of the comparator circuit via the first resistor, and an output terminal of the comparator circuit is connected to an input terminal of the output circuit; and wherein the source circuit is configured to output a first constant excitation signal to the thermistor and output a second constant excitation signal to the first resistor, and the thermistor has a different degree of sensitivity to temperature from the first resistor; the comparator circuit is configured to compare a first signal from the first input terminal of the comparator circuit with a second signal from the second input terminal of the comparator circuit, and output a control signal according to a comparison result, wherein the first signal is associated with the thermistor and the first constant excitation signal, the second signal is associated with the first resistor and the second constant excitation signal, and the control signal is an over-temperature control signal in the case that the comparison result indicates that the temperature is greater than or equal to a protection threshold; and the output circuit is configured to output a disenabling signal in the cast that the comparator circuit outputs the over-temperature control signal.

Optionally, the source circuit includes a constant current source circuit, the comparator circuit includes a voltage comparator, a first output terminal of the constant current source circuit is connected to the first input terminal of the voltage comparator via the thermistor, and a second output terminal of the constant current source circuit is connected to the second input terminal of the voltage comparator via the first resistor; the constant current source circuit is configured to output a first constant current to a negative temperature coefficient resistor via the first output terminal of the constant current source circuit, and output a second constant current to the first resistor via the second output terminal of the constant current source circuit; and the comparator circuit is further configured to compare a first voltage of the first input terminal of the voltage comparator with a second voltage of the second input terminal of the voltage comparator.

Optionally, the thermistor includes a negative temperature coefficient resistor.

Optionally, the first resistor includes a temperature-insensitive variable resistor; or the first resistor includes a positive temperature coefficient resistor.

Optionally, the comparator circuit is further configured to output the over-temperature control signal in the case that the first voltage is equal to the second voltage, or output the non-over-temperature control signal in the case that the first voltage is not equal to the second voltage.

Optionally, the constant current source circuit includes a constant voltage source circuit, a first N-type transistor, a second resistor, a third resistor, a fourth resistor, a second P-type transistor, wherein: a voltage output terminal of the constant voltage source circuit is connected to a collector of the first transistor, the voltage output terminal of the constant voltage source circuit is connected to a base of the first transistor via the second resistor, an emitter of the first transistor is connected to one terminal of the third resistor, the other terminal of the third resistor is connected to one terminal of the fourth resistor, the other terminal of the fourth resistor is grounded, and the emitter of the first transistor is the first output terminal of the constant current source circuit; and a base of the second transistor is connected to a connection point of the third resistor and the fourth resistor, a collector of the second transistor is connected to the base of the second transistor, and an emitter of the second transistor is the second output terminal of the constant current source circuit.

Optionally, the constant voltage source circuit includes: an operational amplifier, a fifth resistor, a first capacitor, a third P-type transistor, a sixth resistor, a potentiometer, a seventh resistor, an eighth resistor, a ninth resistor, a fourth N-type transistor, wherein: a fourth terminal of the operational amplifier is connected to one terminal of the sixth resistor, the other terminal of the sixth resistor is connected with a first fixed contact of the potentiometer, a second fixed contact of the potentiometer is grounded, and a sliding contact of the potentiometer is connected to a third terminal of the operational amplifier; a second terminal of the operational amplifier is connected to a voltage input terminal, and a sixth terminal of the operational amplifier is grounded; a seventh terminal of the operational amplifier is connected to one terminal of the fifth resistor, the other terminal of the fifth resistor is connected to a base of the third transistor, the base of the third transistor is connected to an eighth terminal of the operational amplifier via the first capacitor, an emitter of the third transistor is connected to the voltage input terminal, a collector of the third transistor is connected to a base of the fourth transistor, a collector of the fourth transistor is connected to the voltage input terminal, an emitter of the fourth transistor is connected to one terminal of the ninth resistor, the other terminal of the ninth resistor is the voltage output terminal of the constant voltage source circuit, and the seventh resistor is connected between the base and the emitter of the fourth transistor; one terminal of the eighth resistor is connected to the emitter of the fourth transistor, and the other terminal is connected to the voltage output terminal of the constant voltage source circuit; the operational amplifier comprises a tenth resistor, an eleventh resistor, a twelfth resistor, a thirteenth resistor, a fourteenth resistor, a fifteenth resistor, a sixteenth resistor, a seventeenth resistor, a fifth N-type transistor, a sixth N-type transistor, a seventh P-type transistor, an eighth N-type transistor, a ninth N-type transistor, a tenth N-type transistor, an eleventh N-type transistor, a twelfth N-type transistor, a first diode and a second diode; the tenth resistor is connected in series between the fourth terminal of the operational amplifier and a base of the fifth transistor, a collector of the fifth transistor is connected with one terminal of the eleventh resistor and a base of the sixth transistor, the other terminal of the eleventh resistor is connected with the second terminal of the operational amplifier, an emitter of the fifth transistor is connected with the collector of the twelfth transistor, a collector of the sixth transistor is connected with the second terminal of the operational amplifier, an emitter of the sixth transistor is connected with a base of the seventh transistor, and an emitter of the seventh transistor is connected to the second terminal of the operational amplifier via the twelfth resistor; the emitter of the seventh transistor is connected with a collector of the eighth transistor, and a base of the eighth transistor is connected to the third terminal of the operational amplifier via the thirteenth resistor; the base of the fifth transistor is connected to a cathode of the first diode, the base of the eighth transistor is connected with the cathode of the second diode, and anodes of the first diode and of the second diode are connected with an emitter of the eighth transistor; the emitter of the sixth transistor is connected to a collector of the eleventh transistor via the fourteenth resistor, and the collector of the eleventh transistor is connected with a base of the eleventh transistor; an emitter of the eleventh transistor is connected with the sixth terminal of the operational amplifier; an emitter of the twelfth transistor is connected to the sixth terminal of the operational amplifier via the fifteenth resistor; the sixteenth resistor and the seventeenth resistor are connected in series and then connected between the collector of the seventh transistor and the sixth terminal of the operational amplifier; a collector of the seventh transistor is connected with the eighth terminal of the operational amplifier and a base of the ninth transistor; and a collector of the ninth transistor is connected with a collector of the tenth transistor and the seventh terminal of the operational amplifier, an emitter of the ninth transistor is connected with a base of the tenth transistor, the base of the tenth transistor is connected with a connection point of the sixteenth resistor and the seventeenth resistor, and an emitter of the tenth transistor is connected with the sixth terminal of the operational amplifier.

Optionally, the constant voltage source circuit further includes: a thirteenth P-type transistor, a fourteenth N-type transistor, an eighteenth resistor and a nineteenth resistor, wherein: an emitter of the thirteenth transistor is connected with a base of the thirteenth transistor, and then connected to the voltage output terminal of the constant voltage source circuit, a collector of the thirteenth transistor is connected to one terminal of the eighteenth resistor, the other terminal of the eighteenth resistor is connected to a base of the fourteenth transistor, a collector of the fourteenth transistor is connected to one terminal of the nineteenth resistor, the other terminal of the nineteenth resistor is connected to the eighth terminal of the operational amplifier, and an emitter of the fourteenth transistor is grounded.

Optionally, the constant voltage source circuit further includes: a second capacitor and a twentieth resistor that are connected in series and then connected between the sixth terminal of the operational amplifier and the collector of the fourteenth transistor.

Optionally, the output circuit includes: a twenty-first resistor, a twenty-second resistor, a twenty-third resistor, a twenty-fourth resistor and a tenth N-type transistor, wherein: one terminal of the twenty-first resistor is connected with the output terminal of the comparator circuit, the other terminal of the twenty-first resistor is connected with one terminal of the twenty-second resistor, the other terminal of the twenty-second resistor is connected with a collector of the fifteenth transistor and a voltage input terminal, a base of the fifteenth transistor is connected with a connection point of the twenty-first resistor and the twenty-second resistor, an emitter of the fifteenth transistor is connected with one terminal of the twenty-third resistor, the other terminal of the twenty-third resistor is connected with one terminal of the twenty-fourth resistor, the other terminal of the twenty-fourth resistor is grounded, and a connection point of the twenty-third resistor and the twenty-fourth resistor is the output terminal of the output circuit.

Optionally, the output circuit includes: a twenty-first resistor, a twenty-second resistor, a twenty-third resistor, a twenty-fourth resistor, a twenty-fifth resistor, a twenty-sixth resistor, a fifteenth N-type transistor and a sixteenth N-type transistor, wherein: one terminal of the twenty-first resistor is connected with the output terminal of the comparator circuit, the other terminal of the twenty-first resistor is connected with one terminal of the twenty-second resistor, the other terminal of the twenty-second resistor is connected with a constant voltage input terminal and a collector of the fifteenth transistor, a base of the fifteenth transistor is connected with a connection point of the twenty-first resistor and the twenty-second resistor, an emitter of the fifteenth transistor is connected with one terminal of the twenty-third resistor, the other terminal of the twenty-third resistor is connected with one terminal of the twenty-fourth resistor, the other terminal of the twenty-fourth resistor is grounded, a base of the sixteenth transistor is connected with a connection point of the twenty-third resistor and the twenty-fourth resistor, a collector of the sixteenth transistor is connected with one terminal of the twenty-fifth resistor, the other terminal of the twenty-fifth resistor is connected with the constant voltage input terminal, an emitter of the sixteenth transistor is connected with one terminal of the twenty-sixth resistor, the other terminal of the twenty-sixth resistor is grounded, and a collector of the sixteenth transistor is the output terminal of the output circuit.

Optionally, the control signal is the non-over-temperature control signal in the case that the comparison result indicates that the temperature is less than the protection threshold; the output circuit is further configured to output an enabling signal in the case that the comparator circuit outputs the non-over-temperature control signal.

Optionally, the second resistor has a resistance of 5 KΩ, the third resistor has a resistance of 2 KΩ, the fourth resistor R4 has a resistance of 2KΩ, the fifth resistor has a resistance of 10 KΩ, the first capacitor has a capacitance of 47 pF, the sixth resistor has a resistance of 2 KΩ, the potentiometer has a resistance of 10 KΩ, the seventh resistor has a resistance of 50Ω, the eighth resistor is variable and has a maximum resistance of 5 KΩ, and the eighteenth resistor has a resistance of 10 KΩ, and the nineteenth resistor has a resistance of 10Ω.

Optionally, the twenty-first resistor has a resistance of 500Ω, the twenty-second resistor has a resistance of 500Ω, the twenty-third resistor has a resistance of 500Ω, and the twenty-fourth resistor has a resistance of 50Ω.

Optionally, the twenty-first resistor has a resistance of 500Ω, the twenty-second resistor has a resistance of 500Ω, the twenty-third resistor has a resistance of 500Ω, the twenty-fourth resistor has a resistance of 50Ω, the twenty-fifth resistor has a resistance of 500Ω, and the twenty-sixth resistor has a resistance of 1 KΩ.

An embodiment of the present disclosure provides a driving method for any one of the above-mentioned over-temperature protection circuitry, an output terminal of the output circuit being connected to a protected circuit, including: outputting, by the source circuit, a first constant excitation signal to the thermistor, and outputting a second constant excitation signal to the first resistor; comparing, by the comparator circuit, the first signal of the first input terminal of the comparator with the second signal of the second input terminal of the comparator, and outputting the control signal according to the comparison result; and outputting, by the output circuit, the disenabling signal to the protected circuit in the case that the control signal indicates that the temperature is greater than or equal to the protection threshold, so as to turn off the protected circuit.

Optionally, the method further includes: outputting, by the output circuit, an enabling signal to the protected circuit in the case that the control signal indicates that the temperature is less than the protection threshold, so as to turn on the protected circuit.

Optionally, the disenabling signal is a high level and the enabling signal is a low level; or the disenabling signal is a low level and the enabling signal is a high level.

Other features and advantages of the present disclosure will be illustrated in the description hereinafter, and will partially become apparent from the description or through the implementation of the present disclosure. The purposes and other advantages of the present disclosure may be achieved and obtained by specific structures listed in the description, the claims, and the accompanying drawings.

BRIEF DESCRIPTION OF THE DRAWINGS

The accompanying drawings are provided for a further understanding of the technical solutions of the present disclosure, and constitute a part of the description. The drawings for the embodiments of the present disclosure, together with the embodiments of the present disclosure, are provided for illustrating the technical solutions of the present disclosure, rather than limiting the technical solutions of the present disclosure.

DETAILED DESCRIPTION

In order to make the object, technical solutions and advantages of the present disclosure clearer, the embodiments of the present disclosure will be below described in detail in combination with the drawings. It should be noted that the embodiments in the present application and the features in the embodiments can be combined with each other unless conflicting with each other.

The steps as shown in the flow chart of the drawings can be carried out in a group of computer systems including executable computer instructions. A logic order has been given in the flow chart, but in some cases, the listed or described steps can also be carried out in different orders.

An embodiment of the present disclosure discloses an over-temperature protection circuitry, wherein a constant current source includes an operational amplifier and a transistor, and a comparator circuit includes a voltage comparator, an adjustable resistor and a negative temperature coefficient thermistor, to conduct an over-temperature detection and output a control signal, so as to control the operation of the device, implement soft turn-off in case of over temperature, and protect the circuit.

Figure 1:
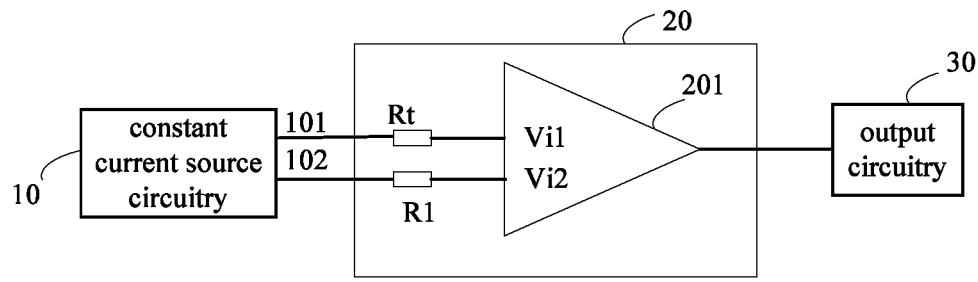
FIG. 1 is a schematic diagram of an over-temperature protection circuitry according to some embodiment of the present disclosure.

As shown in FIG. 1, an embodiment of the present disclosure provides an over-temperature protection circuitry, including: a source circuit (eg. a constant current source circuit 10), a comparator circuit 20 and an output circuit 30, wherein the comparator circuit 20 includes a thermistor (eg. a negative temperature coefficient resistor Rt), a first resistor R1 and a voltage comparator 201.

A first output terminal 101 of the constant current source circuit 10 is connected to a first input terminal Vi1 of the voltage comparator via the negative temperature coefficient resistor Rt; and a second output terminal 102 of the constant current source circuit is connected to a second input terminal Vi2 of the voltage comparator 201 via the first resistor R1.

An output terminal of the voltage comparator 201 (i.e., the output terminal of the comparator circuit 20) is connected with an input terminal of the output circuit 30.

The constant current source circuit 10 is configured to output a first constant current to the negative temperature coefficient resistor Rt via the first output terminal 101, and to output a second constant current to the first resistor R1 via the second output terminal 102.

The comparator circuit 20 is configured to compare a first voltage from the first input terminal Vi1 with a second voltage from the second input terminal Vi2, and to output the control signal according to a comparison result. In the case that the comparison result indicates an over-temperature state, the over-temperature control signal is output. For example, the over-temperature control signal is output in the case that the temperature is greater than or equal to the protection threshold.

The output circuit 30 is configured to output a disenabling signal in the case that the comparator circuit 20 outputs the over-temperature control signal, so as to turn off the protected circuit.

In an optional embodiment of the present disclosure, the first resistor R1 is a temperature-insensitive variable resistor.

In an optional embodiment of the present disclosure, the comparator circuit 20 is further configured to output a non-over-temperature control signal in the case that the temperature is less than the protection threshold, i.e., the control signal is the non-over-temperature control signal in the case that the temperature is less than or equal to the protection threshold.

The output circuit 30 is further configured to output an enabling signal in the case that the comparator circuit 20 outputs the non-over-temperature control signal.

In an optional embodiment of the present disclosure, the outputting a control signal according to the comparison result includes: outputting the over-temperature control signal in the case that the first voltage is equal to the second voltage; or outputting the non-over-temperature control signal in the case that the first voltage is not equal to the second voltage.

It should be noted that the output circuit 30 may also be coupled to a device to be protected (eg. an IC device), and the control signal output by the output circuit 30 may enable or disable the device to be protected. Additionally, in the embodiments of the present disclosure, as for the source circuit, the constant current source circuit is taken as an example, and the constant voltage source circuit may also be adopted. The thermistor may be a negative temperature coefficient resistor, or of course, may also be a positive temperature coefficient resistor. The comparator may be a voltage comparator circuit, or of course, may also be a current comparator circuit.

In some embodiments, a constant voltage may be input across the thermistor and across the temperature-insensitive resistor. In case of a temperature rise, the resistance of the thermistor (eg. the positive temperature coefficient resistor) increases, and the current flowing through the thermistor reduces. At this point, the comparison result of the current comparator may indicate the over-temperature state and the over-temperature control signal is output. The output circuit outputs the disenabling signal in the case that the current comparator outputs the over-temperature control signal.

In some embodiments, the thermistor is a negative temperature coefficient resistor Rt, and the first resistor R1 may also be a positive temperature coefficient resistor.

The present disclosure will be further explained below by means of some specific embodiments.

Figure 2:
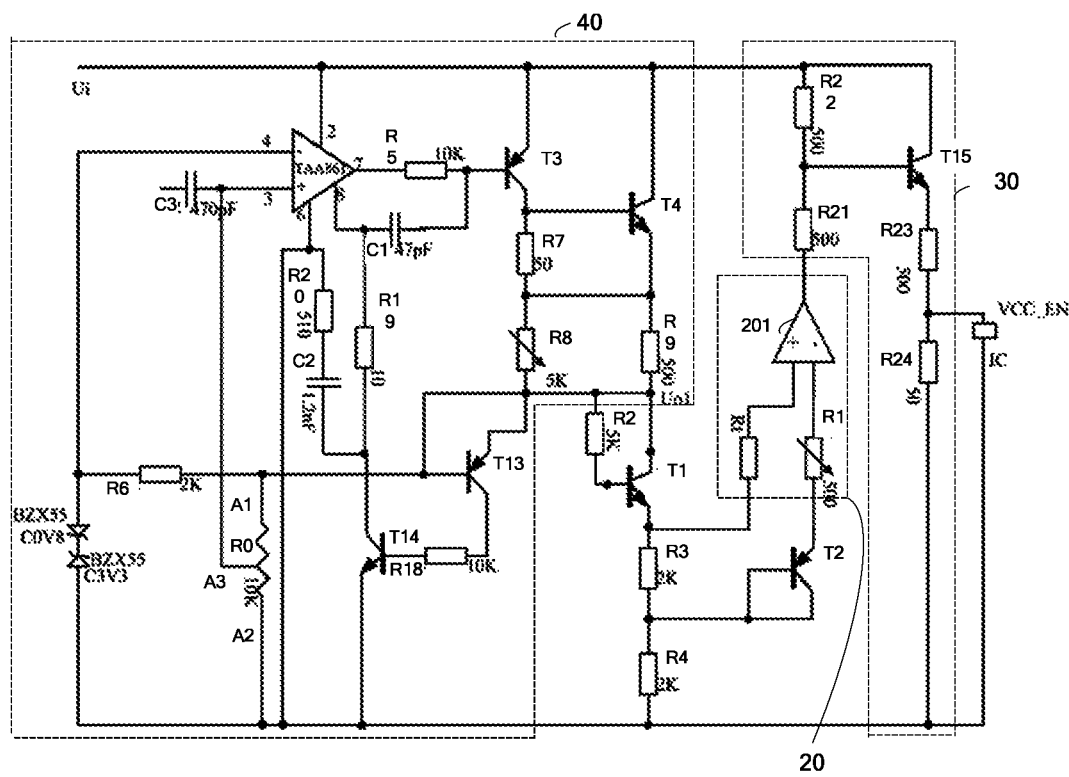
FIG. 2 is a schematic diagram of an over-temperature protection circuitry according to some embodiment of the present disclosure.

An over-temperature protection circuitry is as shown in FIG. 2. The over-temperature protection circuitry may be configured to perform the over-temperature protection on the IC device enabled by a high level. In this circuit, the operational amplifier TAA861 forms a constant voltage source circuit 40, together with a third transistor T3, a fourth transistor T4, a thirteenth transistor T13 and a fourteenth transistor T14. The constant voltage source circuit 40 forms the constant current source circuit 10, together with a first N-type transistor T1, a third resistor R3, a fourth resistor R4 and a second P-type transistor T2. The comparator circuit 20 includes the constant current source circuit 10, the first resistor R1 and the negative temperature coefficient resistor Rt. The output of the comparator circuit 20 is amplified by a fifteenth transistor T15, and controls an enable pin of the IC by divider resistors of a twenty-third resistor R23 and a twenty-fourth resistor R24.

The circuit has the following structure.

An inverted input terminal (a fourth terminal, i.e., pin 4) of the operational amplifier is connected to one terminal of a sixth resistor R6, the other terminal of the sixth resistor R6 is connected to a first fixed contact A1 of a potentiometer R0, a second fixed contact A2 of the potentiometer R0 is connected to the sixth terminal (that is, pin 6) of the operational amplifier, a sliding contact A3 of the potentiometer R0 is connected to an in-phase input terminal (the third terminal, i.e., pin 3) of the operational amplifier, the inverted input terminal of the operational amplifier is connected with one terminal (anode) of a forward diode BZX55C0V8, the other terminal (cathode) of the forward diode BZX55C0V8 is connected with one terminal (cathode) of a backward diode BZX55C3V3, and the other terminal (anode) of the backward diode BZX55C3V3 is grounded. A second terminal (also referred to as a signal input terminal, pin 2) of the operational amplifier is connected with a voltage input terminal Ui, and the sixth terminal (pin 6) of the operational amplifier is grounded. An output terminal (a seventh terminal, that is pin 7) of the operational amplifier is connected with one terminal of the fifth resistor R5, and the other terminal of the fifth resistor R5 is connected to a base of a third P-type transistor T3. The base of the third transistor T3 is connected to a feedback terminal (pin 8) of the operational amplifier, an emitter of the third transistor T3 is connected to a voltage input terminal Ui, and an collector of the third transistor T3 is connected to a base of a fourth N-type transistor T4. A collector of the fourth transistor T4 is connected to the voltage input terminal Ui, and an emitter of the fourth transistor T4 is connected to one terminal of a ninth resistor R9. The other terminal of the ninth resistor R9 is connected with the collector of the first N-type transistor T1; the seventh resistor R7 is connected between the base and the emitter of the fourth transistor T4; one terminal of an eighth resistor R8 is connected to the emitter of the fourth transistor T4, and the other terminal thereof is connected to the collector of the first N-type transistor T1; and the third terminal of the operational amplifier is connected with a third capacitor C3.

An emitter of the thirteenth transistor T13 is connected with its base, and then connected to the collector of the first N-type transistor T1, a collector of the thirteenth transistor T13 is connected to one terminal of a eighteenth resistor R18, and the other terminal of the eighteenth resistor R18 is connected to a base of the fourteenth transistor T14. A collector of the fourteenth transistor T14 is connected to one terminal of a nineteenth resistor R19, the other terminal of the nineteenth resistor R19 is connected to the feedback terminal (pin 8) of the operational amplifier, and an emitter of the fourteenth transistor T14 is grounded. A twentieth resistor R20 and the second capacitor C2 are connected in series between the sixth terminal of the operational amplifier and the collector of the fourteenth transistor T14.

The second resistor R2 is connected between the collector and the base of the first transistor T1, the emitter of the first transistor T1 is connected to one terminal of the third resistor R3; the other terminal of the third resistor R3 is connected to one terminal of the fourth resistor R4, and the other terminal of the fourth resistor R4 is grounded; and the emitter of the first transistor T1 is connected with the negative temperature coefficient resistor Rt.

A base of the second transistor T2 is connected with a connection point between the third resistor R3 and the fourth resistor R4; and a collector of the second transistor T2 is connected to the base of the second transistor T2, and an emitter of the second transistor T2 is connected with the first resistor R1.

One terminal of a twenty-first resistor R21 is connected with the output terminal of the voltage comparator, the other terminal of the twenty-first resistor R21 is connected with one terminal of a twenty-second resistor R22, the other terminal of the twenty-second resistor R22 is connected with the voltage input terminal Ui and a collector of the fifteenth N-type transistor T15, a base of the fifteenth transistor T15 is connected a connection point between the twenty-first resistor R21 and the twenty-second resistor R22 with, an emitter of the fifteenth transistor T15 is connected with one terminal of the twenty-third resistor R23, the other terminal of the twenty-third resistor R23 is connected with one terminal of the twenty-fourth resistor R24, the other terminal of the twenty-fourth resistor R24 is grounded, and a connection point between the twenty-third resistor R23 and the twenty-fourth resistor R24 is the output terminal of the output circuit 30.

R0 is a zero adjustment potentiometer, by adjusting which, the output of the operational amplifier is 0 when its input is 0. The BZX55 series voltage stabilizing diode is configured to clamp a voltage. If the voltage is greater than a clamping voltage, the diode is broken down, so as to protect a corresponding parallel circuit. The output of the operational amplifier is amplified by the third transistor T3 and the fourth transistor T4, a constant voltage is output by the ninth resistor R9, and the output voltage is amplified by the thirteenth transistor T13 and the fourteenth transistor T14, and then fed back to the pin 8 of the operational amplifier, thus guaranteeing the constant output voltage at the pin 7 of the operational amplifier. The third transistor T3 and the fourth transistor T4 are the P-type transistor and the N-type transistor, respectively, and the thirteenth transistor T13 and the fourteenth transistor T14 are the P-type transistor and the N-type transistor, respectively, so as to avoid the temperature shift.

Figure 3:
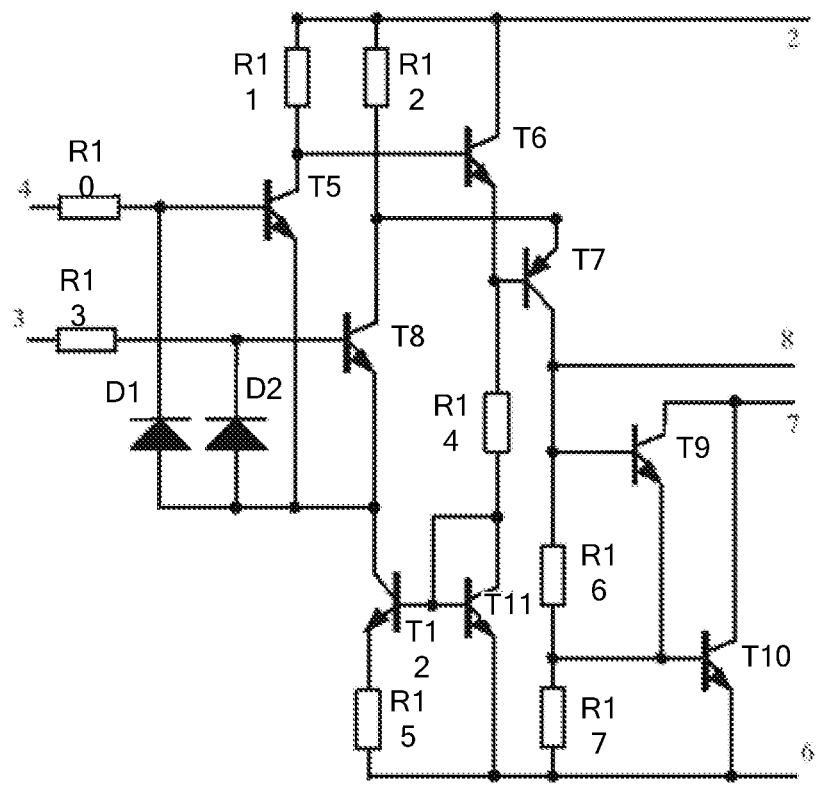
FIG. 3 is a structural schematic diagram of an operational amplifier according to some embodiment of the present disclosure.

The internal circuit integration of the TAA861 operational amplifier is as shown in FIG. 3.

A tenth resistor R10 is connected in series between the pin 4 of the operational amplifier and the base of a fifth N-type transistor T5, a collector of the fifth transistor T5 is connected with one terminal of an eleventh resistor R11 and a base of the sixth N-type transistor T6, the other terminal of the eleventh resistor R11 is connected with the pin 2 of the operational amplifier, an emitter of the fifth transistor T5 is connected with a collector of a twelfth N-type transistor T12, a collector of the sixth transistor T6 is connected with the pin 2 of the operational amplifier, and an emitter of the sixth transistor T6 is connected with the base of a seventh P-type transistor T7. An emitter of the seventh transistor T7 is connected to the pin 2 of the operational amplifier via the twelfth resistor R12, the emitter of the seventh transistor T7 is connected with the collector of an eighth N-type transistor T8, and a base of the eighth transistor T8 is connected to the pin 3 of the operational amplifier via a thirteenth resistor R13. The base of the fifth transistor T5 is connected with a cathode of the first diode D1, the base of the eighth transistor T8 is connected with a cathode of the second diode D2, and the anodes of the first diode D1 and the second diode D2 are connected with an emitter of the eighth transistor T8. The emitter of the sixth transistor T6 is connected to a collector of the eleventh N-type transistor T11 via a fourteenth resistor R14. The collector of the eleventh transistor T11 is connected with its base, and an emitter of the eleventh transistor T11 is connected with the pin 6 of the operational amplifier. An emitter of the twelfth transistor T12 is connected with the pin 6 of the operational amplifier via a fifteenth resistor R15. A sixteenth resistor R16 and a seventeenth resistor R17 are connected in series, and then connected between the collector of the seventh transistor T7 and the pin 6 of the operational amplifier. The collector of the seventh transistor T7 is connected with the pin 8 of the operational amplifier and the base of the ninth N-type transistor T9; and the collector of the ninth transistor T9 is connected with a collector of the thirteenth N-type transistor T10 and a pin 7 of the operational amplifier. An emitter of the ninth transistor T9 is connected with a base of the tenth transistor T10, the base of the tenth transistor T10 is connected with a connection point between the sixteenth resistor R16 and the seventeenth resistor R17, and the emitter of the tenth transistor T10 is connected with the pin 6 of the operational amplifier.

The optional value of each element is shown in FIG. 2. For example, the sixth resistor R6 has a resistance of 2 KΩ, the potentiometer R0 has a resistance of 10 KΩ, the fifth resistor R5 has a resistance of 10 KΩ, the first capacitor C1 has a capacitance of 47 pF, the twentieth resistor R20 has a resistance of 510Ω, the second capacitor C2 has a capacitance of 1.2 nF, the third capacitor C3 has a capacitance of 470 pF, the eighteenth resistor R18 has a resistance of 10 KΩ, the nineteenth resistor R19 has a resistance of 10Ω, the seventh resistor has a resistance of 50Ω, the eighth resistor is variable and has a maximum resistance of 5 KΩ, the ninth resistor has a resistance of 500Ω, the second resistor R2 has a resistance of 5 KΩ, the third resistor R3 has a resistance of 2 KΩ, the fourth resistor R4 has a resistance of 2 KΩ, the first resistor R1 may be variable and has a maximum resistance of 500Ω, the twenty-first resistor R21 has a resistance of 500Ω, the twenty-second resistor R22 has a resistance of 500Ω, the twenty-third resistor R23 has a resistance of 500Ω, and the twenty-fourth resistor R24 has a resistance of 50Ω. It should be noted that the above values are merely examples, and other values may be taken as needed.

The operating principle of the over-temperature protection circuitry is explained below. Since Rt is a negative temperature coefficient thermistor, in case of a temperature change, the resistance changes, which causes a fluctuation, with the temperature change, of the voltage at the in-phase input terminal of the voltage comparator 201. The inverted input terminal of the voltage comparator 201 has a constant voltage. The transistor T2 is configured to stabilize the voltage of the inverted input terminal of the voltage comparator 201. When a temperature of a to-be-controlled IC device is increased due to the power consumption and the environment temperature is increased, the resistance of the negative temperature coefficient thermistor Rt is reduced, thereby reducing the voltage at an in-phase input terminal of the voltage comparator 201. When an over-temperature critical point reaches, the output of the voltage comparator 201 is 0, the fifteenth transistor T15 is disabled, and the level of the enable pin of the to-be-controlled IC device is pulled down to be a low level. As a high-voltage enable device, the IC device is disabled.

The value of the temperature critical point of the over-temperature protection is determined by the first resistor R1 of the inverted input terminal of the voltage comparator 201 and the negative temperature coefficient thermistor Rt. For example, Ui is equal to 5V, and the third transistor T3 and the fourth transistor T4 both operate in a linear zone, to form a Darlington. The power amplification factor is $\beta_1$ and $\beta_2$, with a high current gain, and a voltage gain approximating to 1. Therefore, $I_o = \beta_1 \times \beta_2 \times I_i$, and $U_o = U_i$, that is, $$I_{R17} = U_o/R_{17} = 3.3V/10K = 0.33 \text{ mA} \qquad (1)$$

$$I_{R8} = \beta_1 \times \beta_2 \times I_{R17} = 3.3A \qquad (2)$$

$$U_{O1} = 3.3 \text{ V} \qquad (3)$$

The constant voltage source with a load capability of 3.3 V is generated. The third transistor T3 and the fourth transistor T4 negatively feedback the voltage change in the constant voltage source to the pin 8 of the operational amplifier, the thirteenth transistor T13 is configured to stabilize the voltage, and the fourteenth transistor T14 is configured to amplify a negative feedback voltage value. It is assumed that $\Delta U_{O1}=1$ V, and the amplification factor of the fourteenth transistor T14 is $\beta_4=100$, the partial voltage of the load of the collector of the fourteenth transistor T14 needs to be 1 V:

$$\Delta I_{R_5}=\Delta U_{O1}/R_5=1 \text{ mA} \quad (4)$$

$$\Delta I_{R_5}=\Delta U_{O1}/R_5=1 \text{ mA} \quad (5)$$

$$R_{18}=\Delta U_{O1}/\Delta I_{R_{18}}=10 \text{ }\Omega \quad (6)$$

That is, the thirteenth transistor T13, the fourteenth transistor T14, the eighteenth resistor R18 and the nineteenth resistor R19 are used for the negative feedback circuit, to ensure the stability of the constant voltage source. Moreover, the thirteenth transistor T13 and the fourteenth transistor T14 are PNP and NPN type transistors, respectively, with opposite temperature properties, so as to avoid the temperature shift.

In the operation state, a voltage enable terminal VCC_EN of the passive device (IC device) is a high level, and the IC device operates properly. In case of the temperature rise due to the power consumption and an increase in environment temperature, the resistance of Rt reduces, the input voltage of the in-phase terminal reduces, there is no output from a difference comparator, and a high-impedance state is presented. At this point, the enable terminal voltage VCC_EN is pulled down, and the passive device (IC device) does not work, that is, the operating state of the passive device (IC device) is softly turned off, to enter a over-temperature protection mode.

The over-temperature protection circuitry according to the embodiment of the present disclosure is applicable to an industrial product, and the temperature may be flexibly set when the device is softly turned off according to a requirement for a usage temperature of a product. A different temperature is set when the device enters the soft turn-off state by adjusting the resistance of the adjustable resistor. The principle is as below.

The resistance of the negative temperature coefficient thermistor $R_t$ and the temperature satisfy following relationship: $R_t=R\times e^{B(1/T_t-1/T)}$, where R is a nominal resistor when the temperature T is tested, and B is a constant of 3950, and e is a constant of 2.718. Therefore, according to a temperature point $T_t$ to be monitored, the resistance of $R_t$ is correspondingly obtained, and the resistance of the corresponding adjustable resistor R1 may be determined. The application process is obtained accordingly by an inverse method. By changing the resistance of the adjustable resistor R1, the resistance of $R_t$ is changed correspondingly, therefore the temperature value of the working point to be monitored is changed, and the temperature value when the IC device is softly turned off is determined. Also, since the constant current source formed by the operational amplifier TAA861 and the transistor may drive a heavy-load circuit, a tiny change in resistance of $R_t$ leads to a relatively large voltage value at the input terminal of the voltage comparator. Hence, the sensitivity is high.

Figure 4:
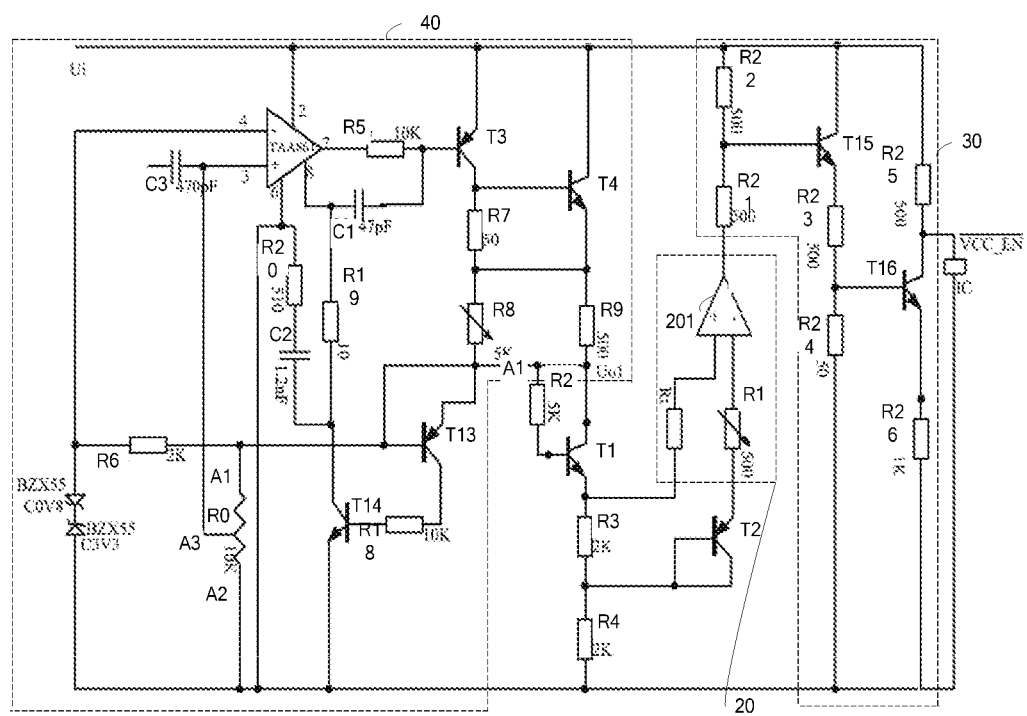
FIG. 4 is a schematic diagram of an over-temperature protection circuitry according to some embodiment of the present disclosure.

The voltage enable pin of the integrated device has different working states, usually, enabled by a high level, and is protected by the circuit shown in FIG. 2. However, if the to-be-protected IC device is enabled by a low level, a NOT gate needs to be added in the circuit shown in FIG. 2. For example, the driving mode is inverted by adding a transistor, and the circuit is as shown in FIG. 4. Compared with FIG. 2, only the output circuit 30 is changed. In the embodiment shown in FIG. 4, the output circuit 30 is as below.

One terminal of the twenty-first resistor R21 is connected with the output terminal of the comparator circuit, the other terminal of the twenty-first resistor R21 is connected with one terminal of the twenty-second resistor R22, the other terminal of the twenty-second resistor R22 is connected with the voltage input terminal Ui and the collector of the fifteenth N-type transistor T15, the base of the fifteenth transistor T15 is connected with a connection point between the twenty-first resistor R21 and the twenty-second resistor R22, the emitter of the fifteenth transistor T15 is connected with one terminal of the twenty-third resistor R23, the other terminal of the twenty-third resistor R23 is connected with the twenty-fourth resistor R24, and the other terminal of the twenty-fourth resistor R24 is grounded. The connection point between the twenty-third resistor R23 and the twenty-fourth resistor R24 is connected with a base of a sixteenth transistor T16, a collector of the sixteenth transistor T16 is connected with one terminal of a twenty-fifth resistor R25, the other terminal of the twenty-fifth resistor R25 is connected with the voltage input terminal Ui, an emitter of the sixteenth transistor T16 is connected with one terminal of a twenty-sixth resistor R26, the other terminal of the twenty-sixth resistor R26 is grounded, and a collector of the twenty-sixth transistor T16 is the output terminal of the output circuit 30. Optionally, the twenty-fifth resistor R25 may have a resistance of 500Ω and the twenty-sixth resistor R26 may have a resistance of 1KΩ. It should be noted that the above values are merely examples, and other values may be taken as needed.

When the temperature of the circuit shown in FIG. 4 does not reach the protection temperature, the voltage comparator 201 operates properly, the voltage is amplified and output, the sixteenth transistor T16 operates properly, and the VCC_EN has a low level, that is, the IC device operates properly. If the temperature increases and reaches the protection temperature, the voltage comparator 201 presents a high-impedance state, and does not operate, there is no current output from the collector of the sixteenth transistor T16, and the voltage value VCC_EN is an input value Ui, that is, a high level. At this point, as for the IC device enabled by a low voltage, the IC device is disabled, thereby protecting the IC device.

It should be noted that the present disclosure is not limited to the specific circuit according to the above-mentioned embodiments. The constant current source circuit and the constant voltage source circuit may also be implemented by other circuit structures, as long as they provide the constant current or the constant voltage. The output circuit may also be substituted with other circuits.

In an embodiment of the present disclosure, a driving method based on the above-mentioned over-temperature protection circuitry is provided, the output terminal of the output circuit being connected to a protected circuit (for example, IC device in FIG. 2), including: outputting, by the output circuit, an disenabling signal to the protected circuit in the case that the temperature is greater than or equal to the protection threshold, so as to turn off the protected circuit.

In an optional embodiment of the present disclosure, the method further includes: outputting, by the output circuit, an enabling signal to the protected circuit in the case that the temperature is less than the protection threshold, so as to turn on the protected circuit.

In an optional embodiment of the present disclosure, the disenabling signal is a high level, and the enabling signal is a low level; or, the disenabling signal is a low level, and the enabling signal is a high level.

The above embodiments are described only for a better understanding of the present disclosure, rather than restricting the present disclosure. Anyone skilled in the art can make amendments to the implementing forms or details without departing from the spirit and scope of the present disclosure. The scope of the present disclosure should still be subject to the scope defined in the claims.

What is claimed is:

1. An over-temperature protection circuitry, comprising: a source circuit, a comparator circuit and an output circuit,
wherein the comparator circuit comprises a thermistor, a first resistor and a voltage comparator, the source circuit is connected to a first input terminal of the comparator circuit via the thermistor and is connected to a second input terminal of the comparator circuit via the first resistor, and an output terminal of the comparator circuit is connected to an input terminal of the output circuit; and
wherein:
the source circuit is configured to output a first constant excitation signal to the thermistor and output a second constant excitation signal to the first resistor, and the thermistor has a different degree of sensitivity to temperature from the first resistor;
the comparator circuit is configured to compare a first signal from the first input terminal of the comparator circuit with a second signal from the second input terminal of the comparator circuit, and output a control signal according to a comparison result, wherein the first signal is associated with the thermistor and the first constant excitation signal, the second signal is associated with the first resistor and the second constant excitation signal, and the control signal is an over-temperature control signal in the case that the comparison result indicates that the temperature is greater than or equal to a protection threshold; and
the output circuit is configured to output a disenabling signal in the case that the comparator circuit outputs the over-temperature control signal,
wherein:
the source circuit comprises a constant current source circuit, the comparator circuit comprises the voltage comparator, a first output terminal of the constant current source circuit is connected to a first input terminal of the voltage comparator via the thermistor, and a second output terminal of the constant current source circuit is connected to a second input terminal of the voltage comparator via the first resistor;
the constant current source circuit is configured to output a first constant current to a negative temperature coefficient resistor via the first output terminal of the constant current source circuit, and output a second constant current to the first resistor via the second output terminal of the constant current source circuit;
the comparator circuit is further configured to compare a first voltage of the first input terminal of the voltage comparator with a second voltage of the second input terminal of the voltage comparator;
the constant current source circuit comprises a constant voltage source circuit, a first N-type transistor, a second resistor, a third resistor, a fourth resistor, a second P-type transistor;
a voltage output terminal of the constant voltage source circuit is connected to a collector of the first transistor, the voltage output terminal of the constant voltage source circuit is connected to a base of the first transistor via the second resistor, an emitter of the first transistor is connected to one terminal of the third resistor, the other terminal of the third resistor is connected to one terminal of the fourth resistor, the other terminal of the fourth resistor is grounded, and the emitter of the first transistor is the first output terminal of the constant current source circuit; and
a base of the second transistor is connected to a connection point of the third resistor and the fourth resistor, a collector of the second transistor is connected to the base of the second transistor, and an emitter of the second transistor is the second output terminal of the constant current source circuit.

2. The over-temperature protection circuitry according to claim 1, wherein the thermistor comprises the negative temperature coefficient resistor.

3. The over-temperature protection circuitry according to claim 2, wherein the first resistor comprises a temperature-insensitive variable resistor; or the first resistor comprises a positive temperature coefficient resistor.

4. The over-temperature protection circuitry according to claim 1, wherein the comparator circuit is further configured to output the over-temperature control signal in the case that the first voltage is equal to the second voltage, or output the non-over-temperature control signal in the case that the first voltage is not equal to the second voltage.

5. The over-temperature protection circuitry according to claim 1, wherein:
the constant voltage source circuit comprises: an operational amplifier, a fifth resistor, a first capacitor, a third P-type transistor, a sixth resistor, a potentiometer, a seventh resistor, an eighth resistor, a ninth resistor, a fourth N-type transistor;
a fourth terminal of the operational amplifier is connected to one terminal of the sixth resistor, the other terminal of the sixth resistor is connected with a first fixed contact of the potentiometer, a second fixed contact of the potentiometer is grounded, and a sliding contact of the potentiometer is connected to a third terminal of the operational amplifier;
a second terminal of the operational amplifier is connected to a voltage input terminal, and a sixth terminal of the operational amplifier is grounded;
a seventh terminal of the operational amplifier is connected to one terminal of the fifth resistor, the other terminal of the fifth resistor is connected to a base of the third transistor, the base of the third transistor is connected to an eighth terminal of the operational amplifier via the first capacitor, an emitter of the third transistor is connected to the voltage input terminal, a collector of the third transistor is connected to a base of the fourth transistor, a collector of the fourth transistor is connected to the voltage input terminal, an emitter of the fourth transistor is connected to one terminal of the ninth resistor, the other terminal of the ninth resistor is the voltage output terminal of the constant voltage source circuit, and the seventh resistor is connected between the base and the emitter of the fourth transistor;
one terminal of the eighth resistor is connected to the emitter of the fourth transistor, and the other terminal is connected to the voltage output terminal of the constant voltage source circuit;
the operational amplifier comprises a tenth resistor, an eleventh resistor, a twelfth resistor, a thirteenth resistor, a fourteenth resistor, a fifteenth resistor, a sixteenth resistor, a seventeenth resistor, a fifth N-type transistor, a sixth N-type transistor, a seventh P-type transistor, an eighth N-type transistor, a ninth N-type transistor, a tenth N-type transistor, an eleventh N-type transistor, a twelfth N-type transistor, a first diode and a second diode;

the tenth resistor is connected in series between the fourth terminal of the operational amplifier and a base of the fifth transistor, a collector of the fifth transistor is connected with one terminal of the eleventh resistor and a base of the sixth transistor, the other terminal of the eleventh resistor is connected with the second terminal of the operational amplifier, an emitter of the fifth transistor is connected with the collector of the twelfth transistor, a collector of the sixth transistor is connected with the second terminal of the operational amplifier, an emitter of the sixth transistor is connected with a base of the seventh transistor, and an emitter of the seventh transistor is connected to the second terminal of the operational amplifier via the twelfth resistor;

the emitter of the seventh transistor is connected with a collector of the eighth transistor, and a base of the eighth transistor is connected to the third terminal of the operational amplifier via the thirteenth resistor;

the base of the fifth transistor is connected to a cathode of the first diode, the base of the eighth transistor is connected with the cathode of the second diode, and anodes of the first diode and of the second diode are connected with an emitter of the eighth transistor;

the emitter of the sixth transistor is connected to a collector of the eleventh transistor via the fourteenth resistor, and the collector of the eleventh transistor is connected with a base of the eleventh transistor;

an emitter of the eleventh transistor is connected with the sixth terminal of the operational amplifier;

an emitter of the twelfth transistor is connected to the sixth terminal of the operational amplifier via the fifteenth resistor;

the sixteenth resistor and the seventeenth resistor are connected in series and then connected between the collector of the seventh transistor and the sixth terminal of the operational amplifier;

a collector of the seventh transistor is connected with the eighth terminal of the operational amplifier and a base of the ninth transistor; and a collector of the ninth transistor is connected with a collector of the tenth transistor and the seventh terminal of the operational amplifier, an emitter of the ninth transistor is connected with a base of the tenth transistor, the base of the tenth transistor is connected with a connection point of the sixteenth resistor and the seventeenth resistor, and an emitter of the tenth transistor is connected with the sixth terminal of the operational amplifier.

6. The over-temperature protection circuitry according to claim 5, wherein:

the constant voltage source circuit further comprises: a thirteenth P-type transistor, a fourteenth N-type transistor, an eighteenth resistor and a nineteenth resistor; and an emitter of the thirteenth transistor is connected with a base of the thirteenth transistor, and then connected to the voltage output terminal of the constant voltage source circuit, a collector of the thirteenth transistor is connected to one terminal of the eighteenth resistor, the other terminal of the eighteenth resistor is connected to a base of the fourteenth transistor, a collector of the fourteenth transistor is connected to one terminal of the nineteenth resistor, the other terminal of the nineteenth resistor is connected to the eighth terminal of the operational amplifier, and an emitter of the fourteenth transistor is grounded.

7. The over-temperature protection circuitry according to claim 6, wherein the constant voltage source circuit further comprises: a second capacitor and a twentieth resistor that are connected in series and then connected between the sixth terminal of the operational amplifier and the collector of the fourteenth transistor.

8. The over-temperature protection circuitry according to claim 6, wherein:

the second resistor has a resistance of 5 KΩ, the third resistor has a resistance of 2 KΩ, the fourth resistor R4 has a resistance of 2 KΩ, the fifth resistor has a resistance of 10 KΩ, the first capacitor has a capacitance of 47 pF, the sixth resistor has a resistance of 2 KΩ, the potentiometer has a resistance of 10 KΩ, the seventh resistor has a resistance of 50Ω, the eighth resistor is variable and has a maximum resistance of 5 KΩ, the eighteenth resistor has a resistance of 10 KΩ, and the nineteenth resistor has a resistance of 10Ω.

9. The over-temperature protection circuitry according to claim 1, wherein:

the output circuit comprises: a twenty-first resistor, a twenty-second resistor, a twenty-third resistor, a twenty-fourth resistor, a twenty-fifth resistor, a twenty-sixth resistor, a fifteenth N-type transistor and a sixteenth N-type transistor; and one terminal of the twenty-first resistor is connected with the output terminal of the comparator circuit, the other terminal of the twenty-first resistor is connected with one terminal of the twenty-second resistor, the other terminal of the twenty-second resistor is connected with a constant voltage input terminal and a collector of the fifteenth transistor, a base of the fifteenth transistor is connected with a connection point of the twenty-first resistor and the twenty-second resistor, an emitter of the fifteenth transistor is connected with one terminal of the twenty-third resistor, the other terminal of the twenty-third resistor is connected with one terminal of the twenty-fourth resistor, the other terminal of the twenty-fourth resistor is grounded, a base of the sixteenth transistor is connected with a connection point of the twenty-third resistor and the twenty-fourth resistor, a collector of the sixteenth transistor is connected with one terminal of the twenty-fifth resistor, the other terminal of the twenty-fifth resistor is connected with the constant voltage input terminal, an emitter of the sixteenth transistor is connected with one terminal of the twenty-sixth resistor, the other terminal of the twenty-sixth resistor is grounded, and a collector of the sixteenth transistor is the output terminal of the output circuit.

10. The over-temperature protection circuitry according to claim 9, wherein the twenty-first resistor has a resistance of 500Ω, the twenty-second resistor has a resistance of 500Ω, the twenty-third resistor has a resistance of 500Ω, the twenty-fourth resistor has a resistance of 50Ω, the twenty-fifth resistor has a resistance of 500Ω, and the twenty-sixth resistor has a resistance of 1 KΩ.

11. A driving method for an over-temperature protection circuitry according to claim 1, an output terminal of the output circuit being connected to a protected circuit, comprising:

outputting, by the source circuit, the first constant excitation signal to the thermistor, and outputting the second constant excitation signal to the first resistor;
comparing, by the comparator circuit, the first signal of the first input terminal of the voltage comparator with the second signal of the second input terminal of the voltage comparator, and outputting the control signal according to the comparison result; and
outputting, by the output circuit, the disenabling signal to the protected circuit in the case that the control signal indicates that the temperature is greater than or equal to the protection threshold, so as to turn off the protected circuit.

12. The driving method according to claim 11, further comprising:
outputting, by the output circuit, an enabling signal to the protected circuit in the case that the control signal indicates that the temperature is less than the protection threshold, so as to turn on the protected circuit.

13. The driving method according to claim 12, wherein the disenabling signal is a high level and the enabling signal is a low level; or the disenabling signal is a low level and the enabling signal is a high level.

14. An over-temperature protection circuitry, comprising: a source circuit, a comparator circuit and an output circuit,
wherein the comparator circuit comprises a thermistor, a first resistor and a voltage comparator, the source circuit is connected to a first input terminal of the comparator circuit via the thermistor and is connected to a second input terminal of the comparator circuit via the first resistor, and an output terminal of the comparator circuit is connected to an input terminal of the output circuit and
wherein:
the source circuit is configured to output a first constant excitation signal to the thermistor and output a second constant excitation signal to the first resistor, and the thermistor has a different degree of sensitivity to temperature from the first resistor;
the comparator circuit is configured to compare a first signal from the first input terminal of the comparator circuit with a second signal from the second input terminal of the comparator circuit, and output a control signal according to a comparison result, wherein the first signal is associated with the thermistor and the first constant excitation signal, the second signal is associated with the first resistor and the second constant excitation signal, and the control signal is an over-temperature control signal in the case that the comparison result indicates that the temperature is greater than or equal to a protection threshold; and
the output circuit is configured to output a disenabling signal in the case that the comparator circuit outputs the over-temperature control signal,
the output circuit comprises: a twenty-first resistor, a twenty-second resistor, a twenty-third resistor, a twenty-fourth resistor and a tenth N-type transistor; and
one terminal of the twenty-first resistor is connected with the output terminal of the comparator circuit, the other terminal of the twenty-first resistor is connected with one terminal of the twenty-second resistor, the other terminal of the twenty-second resistor is connected with a collector of the fifteenth transistor and a voltage input terminal, a base of the fifteenth transistor is connected with a connection point of the twenty-first resistor and the twenty-second resistor, an emitter of the fifteenth transistor is connected with one terminal of the twenty-third resistor, the other terminal of the twenty-third resistor is connected with one terminal of the twenty-fourth resistor, the other terminal of the twenty-fourth resistor is grounded, and a connection point of the twenty-third resistor and the twenty-fourth resistor is the output terminal of the output circuit.

15. The over-temperature protection circuitry according to claim 14, wherein the twenty-first resistor has a resistance of 500Ω, the twenty-second resistor has a resistance of 500Ω, the twenty-third resistor has a resistance of 500Ω, and the twenty-fourth resistor has a resistance of 50Ω.

16. An over-temperature protection circuitry, comprising: a source circuit, a comparator circuit and an output circuit,
wherein the comparator circuit comprises a thermistor, a first resistor and a voltage comparator, the source circuit is connected to a first input terminal of the comparator circuit via the thermistor and is connected to a second input terminal of the comparator circuit via the first resistor, and an output terminal of the comparator circuit is connected to an input terminal of the output circuit and
wherein:
the source circuit is configured to output a first constant excitation signal to the thermistor and output a second constant excitation signal to the first resistor, and the thermistor has a different degree of sensitivity to temperature from the first resistor;
the comparator circuit is configured to compare a first signal from the first input terminal of the comparator circuit with a second signal from the second input terminal of the comparator circuit, and output a control signal according to a comparison result, wherein the first signal is associated with the thermistor and the first constant excitation signal, the second signal is associated with the first resistor and the second constant excitation signal, and the control signal is an over-temperature control signal in the case that the comparison result indicates that the temperature is greater than or equal to a protection threshold; and
the output circuit is configured to output a disenabling signal in the case that the comparator circuit outputs the over-temperature control signal,
the control signal is the non-over-temperature control signal in the case that the comparison result indicates that the temperature is less than the protection threshold; and
the output circuit is further configured to output an enabling signal in the case that the comparator circuit outputs the non-over-temperature control signal.

* * * * *